United States Patent
Yamada

(10) Patent No.: US 8,874,016 B2
(45) Date of Patent: Oct. 28, 2014

(54) PRINTING SYSTEM, PRINTING APPARATUS, AND PRINTER DRIVER

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 719 days.

(21) Appl. No.: 12/732,632

(22) Filed: Mar. 26, 2010

(65) Prior Publication Data

US 2010/0278578 A1  Nov. 4, 2010

(30) Foreign Application Priority Data

Apr. 30, 2009 (JP) ................................ 2009-111606

(51) Int. Cl.
| | |
|---|---|
| G03G 15/20 | (2006.01) |
| B41J 11/00 | (2006.01) |
| G03G 15/00 | (2006.01) |
| G06F 3/12 | (2006.01) |
| G03G 15/23 | (2006.01) |
| B41J 3/60 | (2006.01) |

(52) U.S. Cl.
CPC .............. *G06F 3/1285* (2013.01); *B41J 11/006* (2013.01); *G03G 15/6579* (2013.01); *G06F 3/1234* (2013.01); *G03G 15/70* (2013.01); *G03G 2215/00548* (2013.01); *G03G 2215/0043* (2013.01); *G03G 15/234* (2013.01); *G03G 2215/00586* (2013.01); *G06F 3/121* (2013.01); *B41J 3/60* (2013.01)
USPC .......... 399/309; 399/364; 400/582; 400/583.4

(58) Field of Classification Search
USPC ........... 399/309, 364; 400/582, 583.4; 355/24
See application file for complete search history.

(56) References Cited

U.S. PATENT DOCUMENTS

| | | |
|---|---|---|
| 5,557,367 A | 9/1996 | Yang et al. |
| 2002/0018679 A1 | 2/2002 | Miyajima |
| 2003/0059223 A1 | 3/2003 | Ushio et al. |

(Continued)

FOREIGN PATENT DOCUMENTS

| | | |
|---|---|---|
| CN | 101071293 A | 11/2007 |
| EP | 0 735 430 A2 | 10/1996 |

(Continued)

OTHER PUBLICATIONS

Machine Translation of JP 2006-297654, published on Nov. 2006 by JPO to Ueda et al. "Imaging Forming Apparatus and Image Forming System".*
Extended European Search Report dated Mar. 26, 2012 received from the European Patent Office from related European Application No. 10003299.4.

(Continued)

*Primary Examiner* — David Banh
(74) *Attorney, Agent, or Firm* — Scully, Scott, Murphy & Presser, PC

(57) ABSTRACT

A printing system includes a printing unit performing printing on a sheet, a conveyance mechanism, a control unit, and a selection unit causing a user to select any one of a plurality of methods whose maximum numbers of sheets existing in the conveyance mechanism at the same time are different from each other. The control unit controls the printing unit and the conveyance mechanism to perform double-side printing processing depending on any one of the methods. The control unit performs double-side printing processing in accordance with the method selected by the selection unit.

8 Claims, 10 Drawing Sheets

(56) References Cited

U.S. PATENT DOCUMENTS

| | | | | |
|---|---|---|---|---|
| 2003/0190179 | A1* | 10/2003 | Kinoshita et al. | 399/401 |
| 2004/0076444 | A1* | 4/2004 | Badovinac et al. | 399/81 |
| 2005/0240376 | A1* | 10/2005 | Uwatoko et al. | 702/183 |
| 2006/0133875 | A1* | 6/2006 | Okada et al. | 399/392 |
| 2007/0264039 | A1* | 11/2007 | Saito et al. | 399/81 |
| 2009/0179924 | A1* | 7/2009 | Okada et al. | 347/6 |
| 2010/0129094 | A1 | 5/2010 | Maeda et al. | |
| 2010/0276870 | A1* | 11/2010 | Yamada | 271/225 |
| 2010/0322640 | A1* | 12/2010 | Yamada | 399/11 |

FOREIGN PATENT DOCUMENTS

| | | |
|---|---|---|
| JP | A-08-324051 | 12/1996 |
| JP | H11-284818 A | 10/1999 |
| JP | 2002-37540 | 2/2002 |
| JP | 2003-98910 | 4/2003 |
| JP | 2003-274081 | 9/2003 |
| JP | 2005-41229 | 2/2005 |
| JP | 2005-221821 | 8/2005 |
| JP | 2006-297654 | 11/2006 |
| JP | 2007-030476 A | 2/2007 |
| JP | 2007-58027 | 3/2007 |
| JP | 2008-90219 | 4/2008 |
| JP | 2008-296594 | 12/2008 |
| JP | 2009-6484 | 1/2009 |
| JP | 2009-046303 | 3/2009 |
| JP | 2009-75153 | 4/2009 |
| WO | WO 2009014033 A1 * | 1/2009 |

OTHER PUBLICATIONS

Japanese Official Action dated Apr. 19, 2011 together with an English language translation from JP 2009-111607.

Japanese Official Action dated Apr. 19, 2011 together with an English language translation from related JP 2009-111606.

Decision of Patent Grant dated Oct. 13, 2011 received from the Japanese Patent Office in JP 2009-111607 and U.S. Appl. No. 12/732,867, together with an English-language translation.

Chinese Office Action dated Dec. 26, 2011 received from the Chinese Patent Office from related Chinese Application No. 201010144193.X, together with an English language translation.

U.S. Office Action dated Jul. 23, 2012, received in related U.S. Appl. No. 12/732,867.

Office Action dated Dec. 19, 2012 received from the Chinese Patent Office from related Application No. 201010144193.X, together with an English-language translation.

Chinese Decision on Rejection dated Oct. 10, 2012 received from the Chinese Patent Office from related Chinese Application No. 201010156867.8 and U.S. Appl. No. 12/732,837, together with an English language translation.

Chinese Decision on Rejection dated Oct. 10, 2012 received from the Chinese Patent Office from related Chinese Application No. 201010156867.8 and U.S. Appl. No. 12/732,867, together with an English language translation.

U.S. Office Action dated Aug. 12, 2014 received in related U.S. Patent Application, namely U.S. Appl. No. 12/732,867.

* cited by examiner

FIG. 6

| | | MAXIMUM SHEET NUMBER: ONE | MAXIMUM SHEET NUMBER: TWO |
|---|---|---|---|
| | REQUIRED TIME | 40 SECONDS | 30 SECONDS |
| | OVERALL JAMMING OCCURRENCE PROBABILITY | 1.0% | 1.2% |
| | REVERSING JAMMING OCCURRENCE PROBABILITY | 0.5% | 1.0% |

PRINTING SETTING

DOUBLE SIDE SETTING CONDITION   METHOD LINKAGE SELECTION  TRAY 1

- DOUBLE SIDE PRINTING: OFF ○  ON ●
- REVERSING METHOD: OFF ○  ON ●
- MAXIMUM SHEET NUMBER: ONE SHEET ●  TWO SHEET ○
- MANUAL DX AUTO-SWITCHING: OFF ○  ON ●
- DX JAMMING INFORMATION ACQUISITION: [ACQUIRE]

[OK]  [CANCEL]  [APPLICATION (A)]  [HELP]

FIG. 7

| METHOD LINKAGE TABLE | | | |
|---|---|---|---|
| METHOD LINKAGE ITEM | REVERSING METHOD | MAXIMUM SHEET NUMBER | MANUAL METHOD AUTO-SWITCHING |
| FIRST TRAY | ON | 2 | OFF |
| SECOND TRAY | OFF | — | — |
| REGULAR PAPER | ON | 2 | ON |
| THICK PAPER | OFF | — | — |
| ULTRA-THICK PAPER | OFF | — | — |
| OHP | OFF | — | — |
| COLOR PRINTING | ON | 1 | ON |
| MONOCHROME PRINTING | ON | 2 | ON |

FIG. 10

JAMMING INFORMATION TABLE

| | ACCUMULATIVE NUMBER OF PRINTED SHEETS | TOTAL NUMBER OF JAMMING | TOTAL JAMMING OCCURRENCE PROBABILITY | NUMBER OF REVERSING JAMMING | REVERSING JAMMING OCCURRENCE PROBABILITY | REQUIRED TIME |
|---|---|---|---|---|---|---|
| 2413 METHOD | 580 | 7 | 1.2% | 6 | 1.0% | 30 SECOND |
| 21 METHOD | 190 | 2 | 1.0% | 1 | 0.5% | 40 SECOND |

# PRINTING SYSTEM, PRINTING APPARATUS, AND PRINTER DRIVER

CROSS REFERENCE TO RELATED APPLICATION

The present application claims priority from Japanese Patent Application No. 2009-111606, which was filed on Apr. 30, 2009, the disclosure of which is incorporated herein by reference in its entirety.

BACKGROUND

The present invention relates to a printing system having a double-side printing function, a printing apparatus, and a printer driver.

In the method which is well-known as the double-side printing method of a printing apparatus, printing on one side of each sheet and printing on the other side of the sheet are continuously performed from the beginning to the end of the printing. Hereinafter, this method is referred to as a double-side continuous printing method. On the other hand, there is provided a printing apparatus adopting a method in which between printing on one side and printing on the other side of one sheet, one side of another sheet is printed. In other words, the method includes a process of continuously performing printing on one side for a plurality of sheets. Hereinafter, this method is referred to as one sided continuous printing method. According to the one sided continuous printing method, a reversing period of one sheet, which is required from printing on one side to printing on the other side of the sheet, is allocated to printing of another sheet. Accordingly, it is possible to perform the printing processing at a higher speed than in the double-side continuous printing method.

SUMMARY

The above-described one sided continuous printing method has an advantage in that the printing processing can be performed at a higher speed than in the double-side continuous printing method. In the one sided continuous printing method, however, a larger number of sheets may exist in a sheet conveyance path inside the printing apparatus at the same time, compared with the double-side continuous printing method. Therefore, when the double-side printing processing is stopped by sheet jamming or blackout, a larger number of sheets may be held in the sheet conveyance path than in the double-side continuous printing method. In this case, it may take a lot of time to remove the sheets.

An advantage of the present invention is that it provides a printing system, a printing apparatus, and a printer driver, capable of improving the convenience of double side printing.

According to the first aspect of the present invention, a printing system comprises:

a printing unit configured to perform printing on a sheet;

a conveyance mechanism that includes a printing path for guiding the sheet to a printing position of the printing unit and a reverse path for reversing the sheet which passes through the printing path and guiding the reversed sheet to the printing position once again;

a control unit configured to perform double-side printing processing using any one of a plurality of methods whose maximum numbers of sheets existing in the conveyance mechanism at the same time are different from each other; and a selection unit select any one of the plurality of methods according to instruction from a user, wherein the control unit performs the double-side printing processing in accordance with the method selected by the selection unit.

According to another aspect of the present invention, a printing apparatus includes:

a printing unit configured to perform printing on a sheet;

a reversing mechanism configured to reverses the sheet passing through a printing position of the printing unit and guides the sheet to the printing position once again;

a control unit configured to control the printing unit and the reversing mechanism to perform double-side printing processing depending on any one of a plurality of methods whose maximum numbers of sheets existing in the reversing mechanism at the same time are different from each other; and an acquisition unit configured to acquire, from a user selection, information regarding which of the plurality of methods is selected, wherein the control unit performs double-side printing processing in accordance with the information acquired by the acquisition unit.

According to another aspect of the present invention, there is provided a printer driver for a printing apparatus including a conveyance mechanism and performing double-side printing processing depending on a plurality of methods whose maximum numbers of sheets existing in the conveyance mechanism at the same time are different from each other, the printer driver causing an information processing device which is connected to communicate with the printing apparatus to:

selecting any one of the plurality of methods according to instruction from a user; and instructing the printing apparatus to perform the double-side printing processing in accordance with the selected method.

BRIEF DESCRIPTION OF THE DRAWINGS

FIG. 6 is a diagram showing a double-side printing setting screen.

FIG. 7 is a diagram showing an example of contents of a method linkage table.

FIG. 10 is a diagram showing an example of contents of a jamming information table.

DESCRIPTION OF EXEMPLARY EMBODIMENTS

Exemplary embodiments of the present invention will be described with reference to the drawings.

1. Electrical Configuration of Printing System

Figure 1:
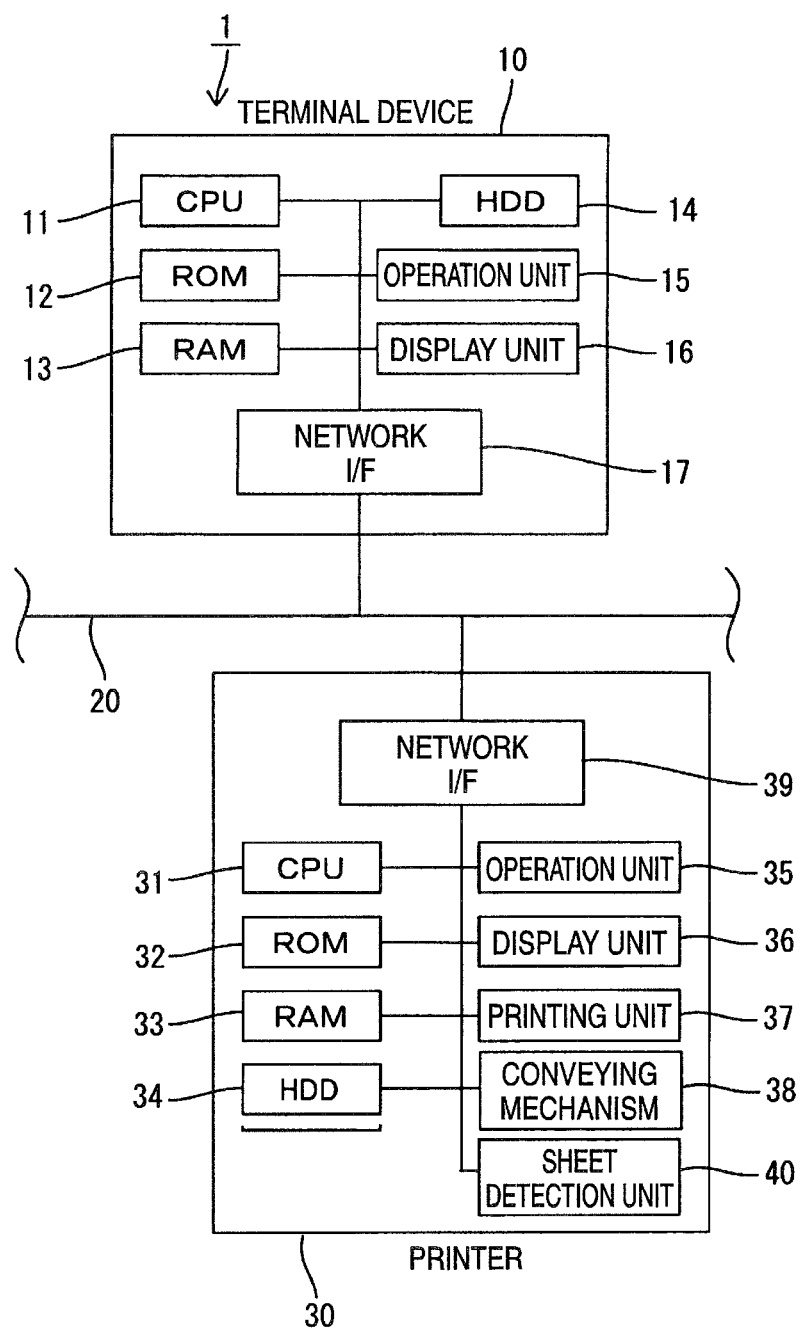
FIG. 1 is a block diagram illustrating the electrical configuration of a printing system according to an embodiment of the present invention.

FIG. 1 is a block diagram illustrating the electrical configuration of a printing system 1 according to an embodiment of the present invention. The printing system 1 includes a terminal device 10 as an example of a personal computer and an information processing device and a printer 30 as an example of a printing apparatus.

The terminal device 10 includes a CPU 11 as an example of an acquisition unit, a ROM 12, a RAM 13, a hard disk drive (HDD) 14 as an example of a memory, an operation unit 15 having a keyboard or pointing device, a display unit 16 having a liquid crystal display or the like, and a network interface 17 connected to a communication line 20. The HDD 14 stores an operating system (OS), application software capable of writing printing data, and various programs such as a printer driver for controlling the printer 30.

The printer 30 includes a CPU 31 (an example of a control unit, a changing unit, and a calculation unit), a ROM 32, a RAM 33, a HDD 34, an operation unit 35, a display unit 36, a printing unit 37, a conveyance mechanism 38, a network interface 39, and a sheet detection unit 40. The ROM 32 stores various programs for controlling the operation of the printer 30. The CPU 31 controls the operation of the printer 30 in accordance with a program read from the ROM 32, while storing the processing result into the RAM 33.

The operation unit 35 includes a plurality of buttons through which a variety of input operations such as a printing start instruction can be made by a user. The display unit 36 includes a liquid crystal display or lamp to display various setting screens or operation states. The printing unit 37 performs printing on a sheet W such as a paper. The network interface 39 is connected to the external terminal device 10 or the like through the communication line 20 such that interactive data communication can be performed. The conveyance mechanism 38 and the sheet detection unit 40 will be described below.

2. Internal Configuration of Printer

Figure 2:
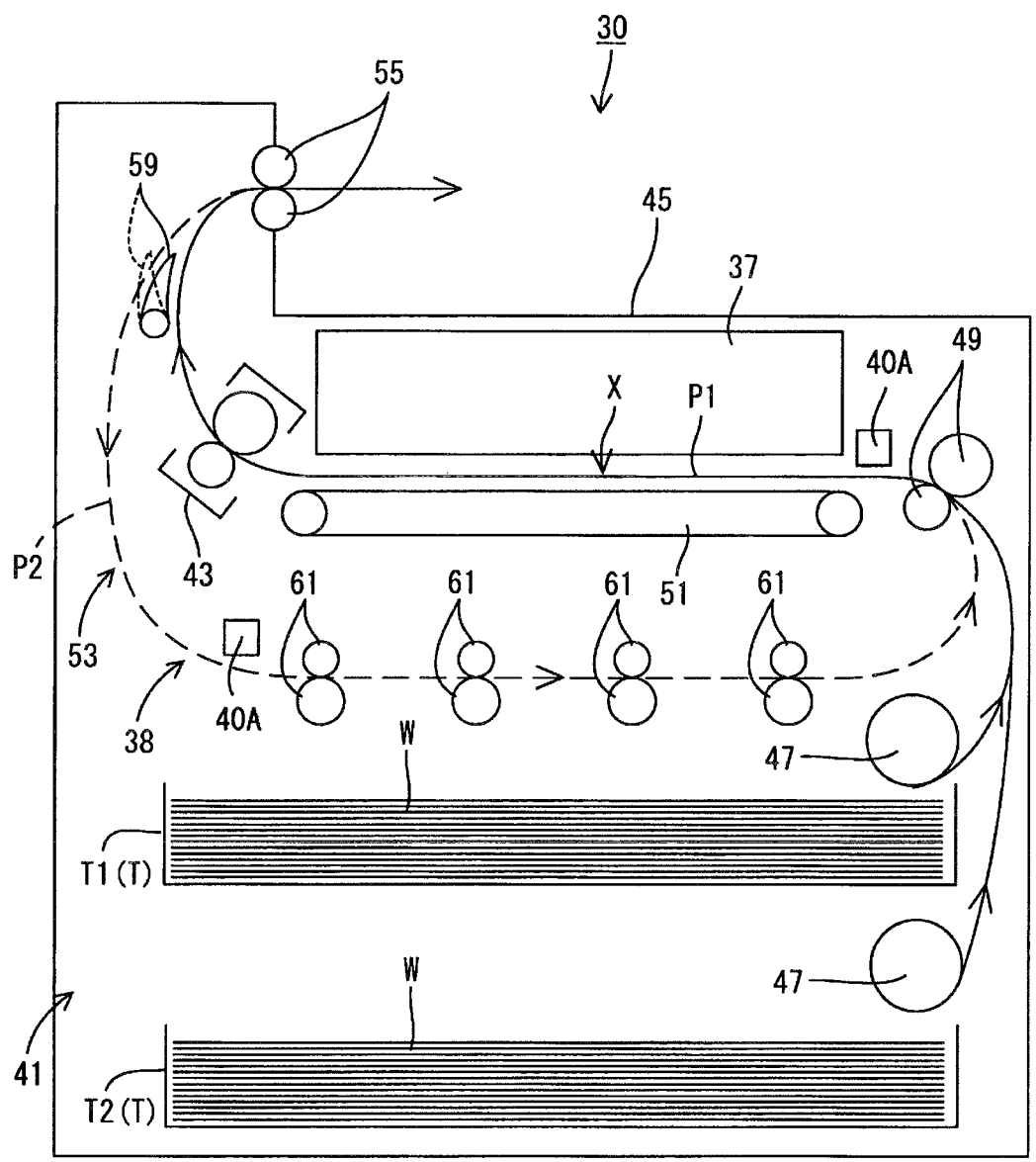
FIG. 2 is a schematic view illustrating the internal configuration of the printer.

FIG. 2 is a schematic view illustrating the internal configuration of the printer 30.

The printer 30 includes a housing unit 41, the conveyance mechanism 38, the printing unit 37, a fixing unit 43, and a discharge tray 45.

The housing unit 41 is provided in the bottom portion of the printer 30, and includes a plurality (for example, two) of trays T, each of which accommodates sheets W. Hereinafter, when the respective trays T are discriminated, they are sequentially referred to as a first tray T1 and a second tray T2 from the uppermost tray.

The conveyance mechanism 38 includes a pickup roller 47, a pair of registration rollers 49, 49, a sheet conveyance belt 51, and a reversing mechanism 53. The pickup roller 47 picks up the sheets W accommodated in the tray T one by one, and then conveys the sheet W to the registration rollers 49, 49. The registration rollers 49, 49 adjust the posture of the conveyed sheet W to deliver onto the sheet conveyance belt 51 at predetermined timing.

The printing unit 37 forms an image (monochrome image or color image) at a predetermined printing position X on the sheet W conveyed by the sheet conveyance belt 51, based on printing data received from the terminal device 10, for example. The sheet W having the image formed thereon is thermally fixed by the fixing unit 43 and then discharged onto the discharge tray 45. A path for guiding the sheet W from the tray T to the printing position X, which is indicated by a solid arrow of FIG. 2, is referred to as a printing conveyance path P1 as an example of printing paths.

The reversing mechanism 53 includes a discharge roller 55, a reverse conveyance path P2 as an example of reverse paths, which is indicated by the dotted-line arrow in FIG. 2, a flapper 59, and a plurality of reversing conveyance rollers 61. For example, when double-side printing is performed by the double-side continuous printing method, an image is printed on the rear surface of the sheet W by the printing unit 37. The rear surface corresponds to a lower surface of the sheet W when the sheet W is accommodated. Then, the sheet W is conveyed to the discharge roller 55. The sheet W is conveyed through the flapper 59, the reverse conveyance path P2, the plurality of reversing conveyance rollers 61, and the registration rollers 49, 49 by the reverse rotation of the discharge roller 55, and then delivered onto the tray 51 in a state in which the front and rear surfaces are reversed. Then, an image is printed on the front surface of the sheet W by the printing unit 37, which corresponds to an upper surface of the sheet W when the sheet W is accommodated in the tray T, and the sheet W is discharged onto the discharge tray 45.

The sheet detection unit 40 includes a plurality of sensors 40A which outputs a detection signal depending on whether or not a sheet W is present at the respective conveyance positions inside the conveyance mechanism 38. When the CPU 31 consecutively receives a detection signal indicating the presence of the sheet W from the respective sensors 40A for a predetermined time or more or does not receive a detection signal for a predetermined time or more, the CPU 31 determines that jamming (sheet jamming) occurred at the respective positions. In this embodiment, as illustrated in FIG. 2, one or more sensors 40A are provided in the printing conveyance path P1 and the reverse conveyance path P2, respectively. Therefore, the CPU 31 also can determine whether or not jamming occurs in any one of the printing conveyance path P1 and the reverse conveyance path P2.

3. Methods of Double-Side Printing Processing

Figure 3:
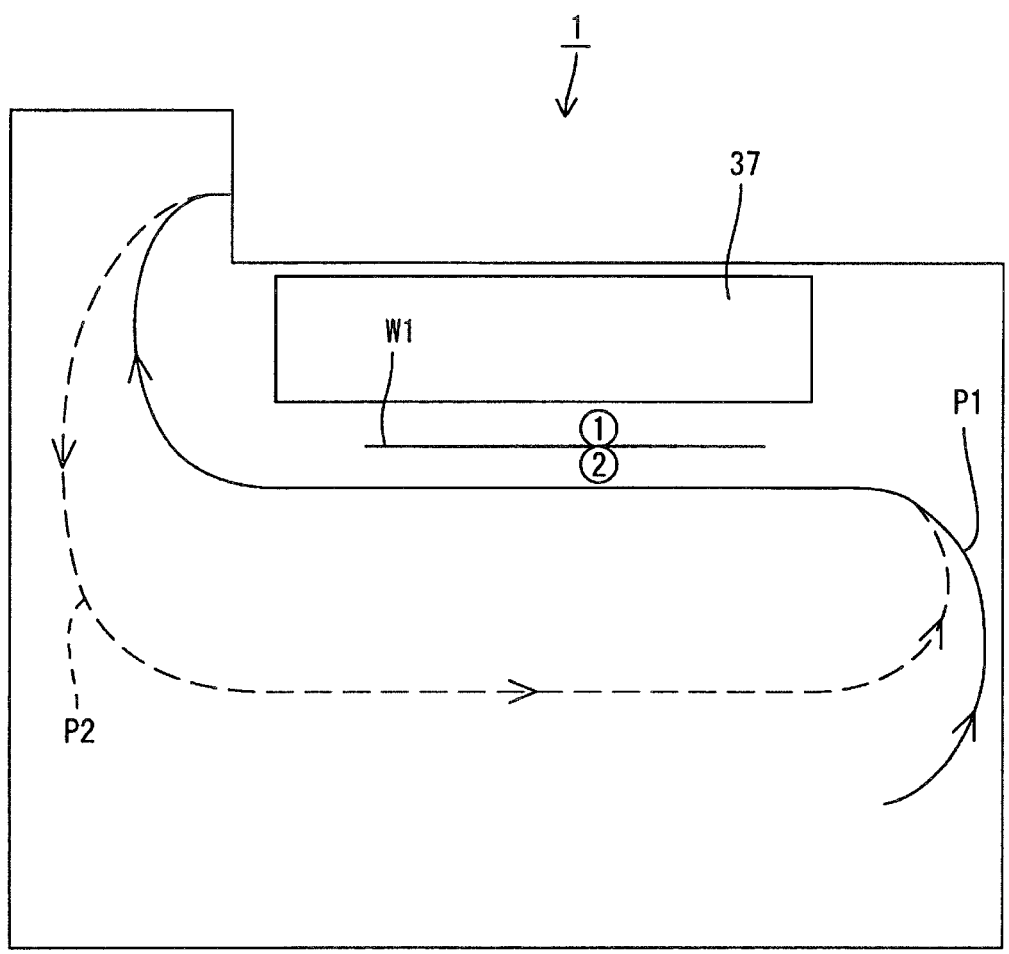
FIG. 3 is a pattern diagram explaining a 21 method.
Figure 4:
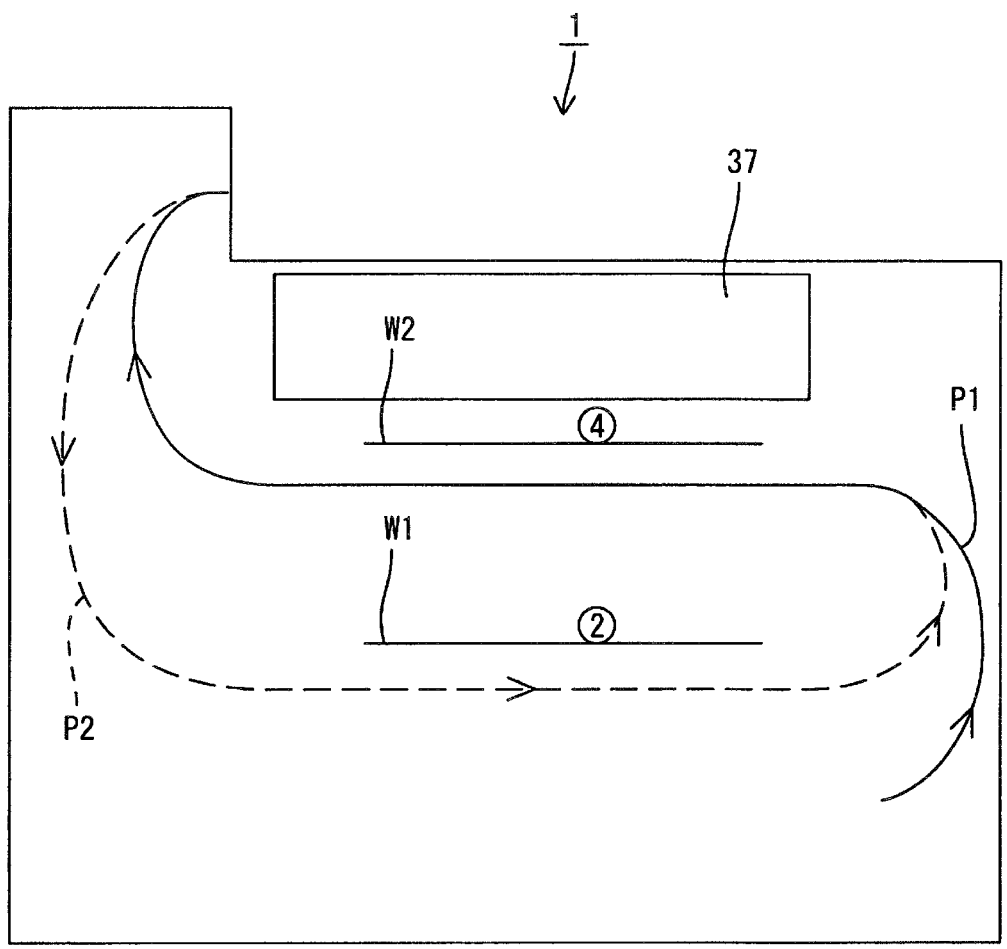
FIG. 4 is a pattern diagram explaining a 2413 method.
Figure 5:
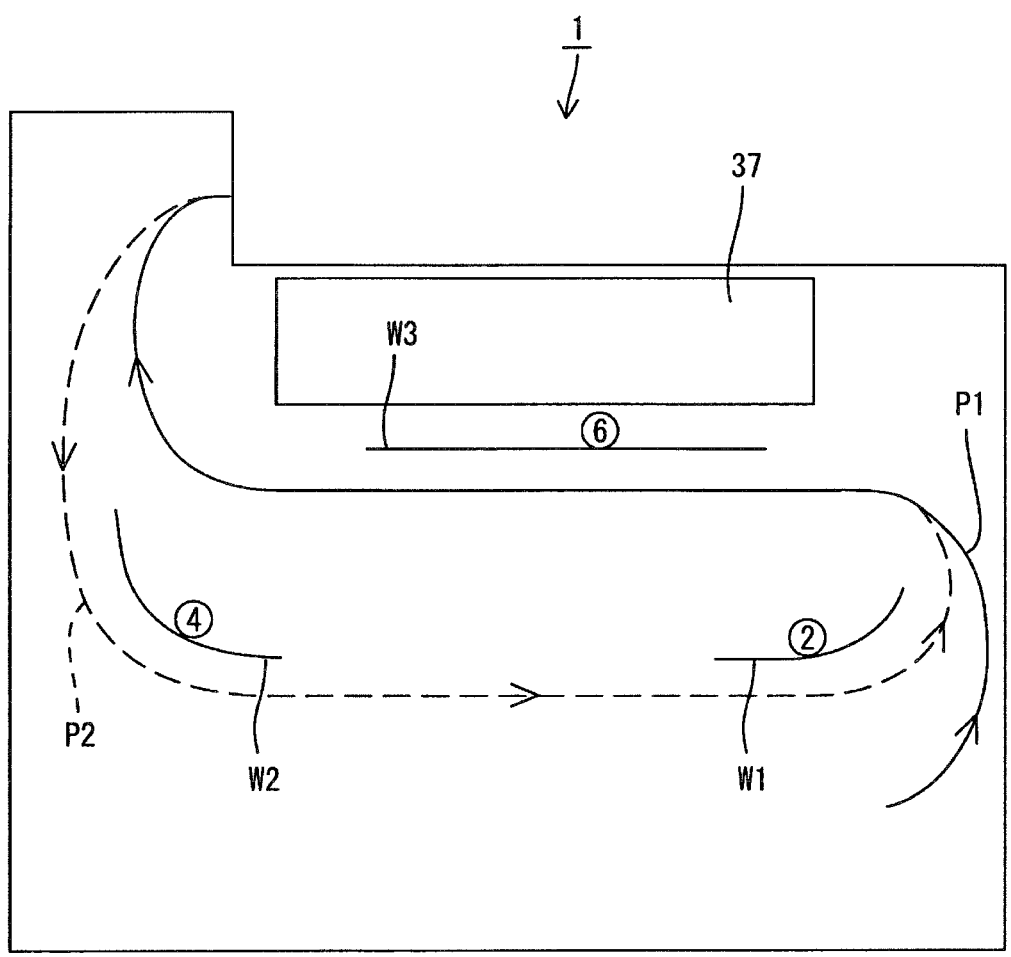
FIG. 5 is a pattern diagram explaining a 246135 method.

FIGS. 3 to 5 are pattern diagrams explaining methods of the double-side printing processing. In the respective drawings, a number surrounded by a circle means that an image corresponding to the sequence of the number is formed on the surface of sheet W at the side where the number is attached. The printer 30 can perform the double-side printing method depending on a plurality of methods. The plurality of methods are classified into a reversing method which uses the reversing mechanism 53 and a non-reversing method which does not use the reversing mechanism 53. The reversing method is classified depending on a difference in the maximum number of sheets W existing in the conveyance mechanism 38 at the same time. The sheets W have an image formed on one surface thereof, and does not have an image formed on the other surface thereof. Hereinafter, examples of the methods will be described.

(Reversing Method)

Method of which the maximum sheet number is 1:21 method

Method of which the maximum sheet number is 2:2413 method (an example of a definite loop type in which an operation of performing printing on the front surfaces of a plurality of sheets after performing printing on the rear surfaces of the sheets is repeated) and 241635 method (an example of an infinite loop type in which while printing is performed on the front surface of a sheet after printing is performed on the rear surface of the sheet, printing is performed on a new sheet W)

Method of which the maximum sheet number is 3:246135 method (an example of the definite loop type) (Although not illustrated, there is also an infinite loop type.)

(Non-Reversing Method)

Method of which the maximum sheet number is 0: manual method

The 21 method is a double-side continuous printing method in which printing on one surface and printing on the other surface for each sheet W1 are continuously performed from the beginning to the end of the printing. For example, when six page images are printed on both surfaces of three sheets W, the printer 30 performs printing in the following sequence:

Second image (rear surface of first sheet W1)
First image (front surface of first sheet W1)
Fourth image (rear surface of second sheet W2)
Third image (front surface of second sheet W2)
Sixth image (rear surface of third sheet W3)
Fifth image (front surface of third sheet W3)

In the 21 method, while printing is performed on the front surface of a sheet W after the printing is performed on the rear surface of the sheet W, the printer 30 does not perform printing on another sheet W. For example, as illustrated in FIG. 3, while the first image is printed on the front surface of the sheet W1 after the second image is printed on the rear surface of the first sheet W1, the second sheet W or later is not printed. Accordingly, the maximum sheet number is one.

The 2413 method includes a process in which while printing is performed on the front surface of a sheet W after printing is performed on the rear surface of the sheet W, printing is performed on the rear surface of another sheet W. For example, when six page images are printed on both surfaces of three sheets W, the printer 30 performs printing in the following sequence:

Second image (rear surface of first sheet W1)
Fourth image (rear surface of second sheet W2)
First image (front surface of first sheet W1)
Third image (front surface of second sheet W2)
Sixth image (rear surface of third sheet W3)
Fifth image (front surface of third sheet W3)

In the 2413 method, as illustrated in FIG. 4, when the first sheet W1 having the second image printed thereon exists in the reverse conveyance path P2, the second sheet W2 exists in the printing conveyance path P1. Accordingly, the maximum sheet number is two.

The 246135 method includes a process in which while printing is performed on the front surface of a sheet W after printing is performed on the rear surface of the sheet W, printing is performed on the rear surfaces of two other sheets W. For example, when six page images are printed on both surfaces of three sheets W, the printer 30 performs printing in the following sequence:

Second image (rear surface of first sheet W1)
Fourth image (rear surface of second sheet W2)
Sixth image (rear surface of third sheet W3)
First image (front surface of first sheet W1)
Third image (front surface of second sheet W2)
Fifth image (front surface of third sheet W3)

In the 246135 method, as illustrated in FIG. 5, when the first sheet W1 having the second image printed thereon and the second sheet W2 having the fourth image printed thereon exist in the reverse conveyance path P2, the third sheet W3 exists in the printing conveyance path P1. Accordingly, the maximum sheet number is three. Hereinafter, the 246135 method will be omitted to simplify the descriptions.

In the manual method, one or more sheets W are discharged to the discharge tray 45 without passing through the reverse conveyance path P2, in a state in which only the rear surfaces thereof are printed. The discharged sheets W are reset on the tray T by a user such that the rear surfaces (printed surfaces) thereof face upward. Then, the front surface of the reset sheets W are printed, and the sheets W are discharged to the discharge tray 45 without passing through the reverse conveyance path P2. Accordingly, in the manual method, the maximum sheet number is 1 or 2 which is the number of sheets which can be accommodated in the printing conveyance path P1, but the sheets do not pass through the reverse conveyance path P2.

4. Printing Control Processing

The printing system 1 performs printing control processing which will be described below, such that double-side printing processing can be performed in accordance with a method selected by a user from the above-described methods. Hereinafter, the following descriptions of the printing control processing will be divided into processing at the terminal device 10 and processing at the printer 30.

4-1. Processing at Terminal Device

FIG. 6 is a diagram illustrating a double-side printing setting screen. When a user inputs a printing request on application software handling a document or image through the operation unit 15, the CPU 11 reads the printer driver from the HDD 14 to selectively display a basic setting screen for setting general printing conditions such as sheet size and image quality, extended function screens, and a support screen on the display unit 16. The double-side printing setting screen is one of the extended function screens.

The double side setting screen includes a method linkage selection field, a double-side printing field, a reversing method field, a maximum sheet number field, a manual method auto-switching field, and a jamming information acquisition field. In the double-side printing field, as a user switches over between ON and OFF buttons, any one of the double-side printing processing and the one side printing processing can be selectively performed. Furthermore, when the one side printing processing is selected, that is, the OFF button is clicked, the other fields may be grayed out so as not to be selected.

In the reversing method field, as the user switches over between ON and OFF buttons, any one of the reversing method and the non-reversing method may be selected. Furthermore, when the non-reversing method is selected, that is, the OFF button is clicked, the maximum sheet number field and the manual method auto-switching field may be grayed out so as not to be selected.

In the maximum sheet number field, as the user selects the number (one or two) of sheets, a reversing method corresponding to the selected sheet number can be selected. At this time, the operation unit 15 functions as a selection unit, and the CPU 11 functions as an acquisition unit. In the manual method auto-switching field, as the user switches over between ON and OFF buttons, it is possible to select whether or not to allow the reversing method selected by the user to be automatically switched to the manual method.

In the method linkage selection field, method linkage items including the number of the tray T (the first tray T1 and the second tray T2), the type of the sheet W (regular paper, thick paper, ultra-thick paper, and overhead projector (OHP) paper), and the number of colors may be pull-down displayed. In this embodiment, as the user selects any one of the method linkage items, any one of combination patterns of the respective options of the reversing method field, the maximum sheet number field, and the manual method auto-switching field may be automatically selected. This configuration will be described in detail.

FIG. 7 is a diagram showing an example of a method linkage table. The method linkage table as an example of correspondence information is stored in the HDD 14. As shown in FIG. 7, each of the method linkage items on the method linkage table is associated with a combination pattern of the reversing method field, the maximum sheet number field, and the manual method auto-switching field. For example, as the user performs an operation through the operation unit 15, the contents of the method linkage table may be changed. In FIG. 6, the tray 1 is displayed as a default value. However, as the user performs an operation through the operation unit 15, the default display may be changed into another method linkage item.

When the user selects the first tray T1 in the method linkage selection field, the CPU 11 displays a double-side printing setting screen on which the reversing method and the manual method auto-switching permission are selected and the maximum sheet number is set to two, by referring to the method linkage table. Accordingly, the user can save time required for individually changing the selection of the respective fields. After the selection of the method linkage items, the user may or may not change the selection of the respective fields individually.

In the example of FIG. 7, when the first tray T1 is selected, the reversing method is selected. However, when the second tray T2 is selected, the non-reversing method is selected. In this case, when regular papers are set in the first tray T1 and high-grade papers such as glazed papers are set in the second tray T2, it is possible to prevent the double-side printing processing from being performed on the high-grade papers in accordance with the reversing method in which jamming may easily occur in comparison with the non-reversing method. Furthermore, in the reversing method, the reverse conveyance path P2 as well as the printing conveyance path P1 is used. Therefore, since the maximum sheet number may become larger than in the non-reversing method, paper jamming easily occurs.

When the acquisition button of the jamming information acquisition field is clicked, jamming information can be displayed on the double-side printing setting screen. The jamming information includes a required time, a total jamming occurrence probability, and a reversing jamming occurrence probability for each of the methods having a different maximum sheet number. The required time is a mean required time when a reference number of sheets W (for example, ten sheets) are printed. The reference number may be a fixed value or the number of printed sheets corresponding to printing data. In the latter, a time obtained by multiplying the reference number by the unit required time per sheet W for each method may be set to the required time.

The total jamming occurrence probability is an occurrence probability of jamming (hereinafter, referred to as total jamming) which occur in the printer 30 including the printing conveyance path P1 and the reverse conveyance path P2, when the double-side printing is performed by each of the methods. In this embodiment, the total jamming occurrence probability is calculated by dividing the occurrence total number of jamming by the accumulative number of printed sheets W in the printer 30. In particular, the accumulative number of double-side printed sheets is more desirable. The reversing jamming occurrence probability is an occurrence probability of jamming (hereinafter, referred to as reversing jamming) which occur only in the reverse conveyance path P2. In this embodiment, the reversing jamming occurrence probability is calculated by dividing the occurrence number of reversing jamming by the accumulative number of printed sheets.

Figure 8:
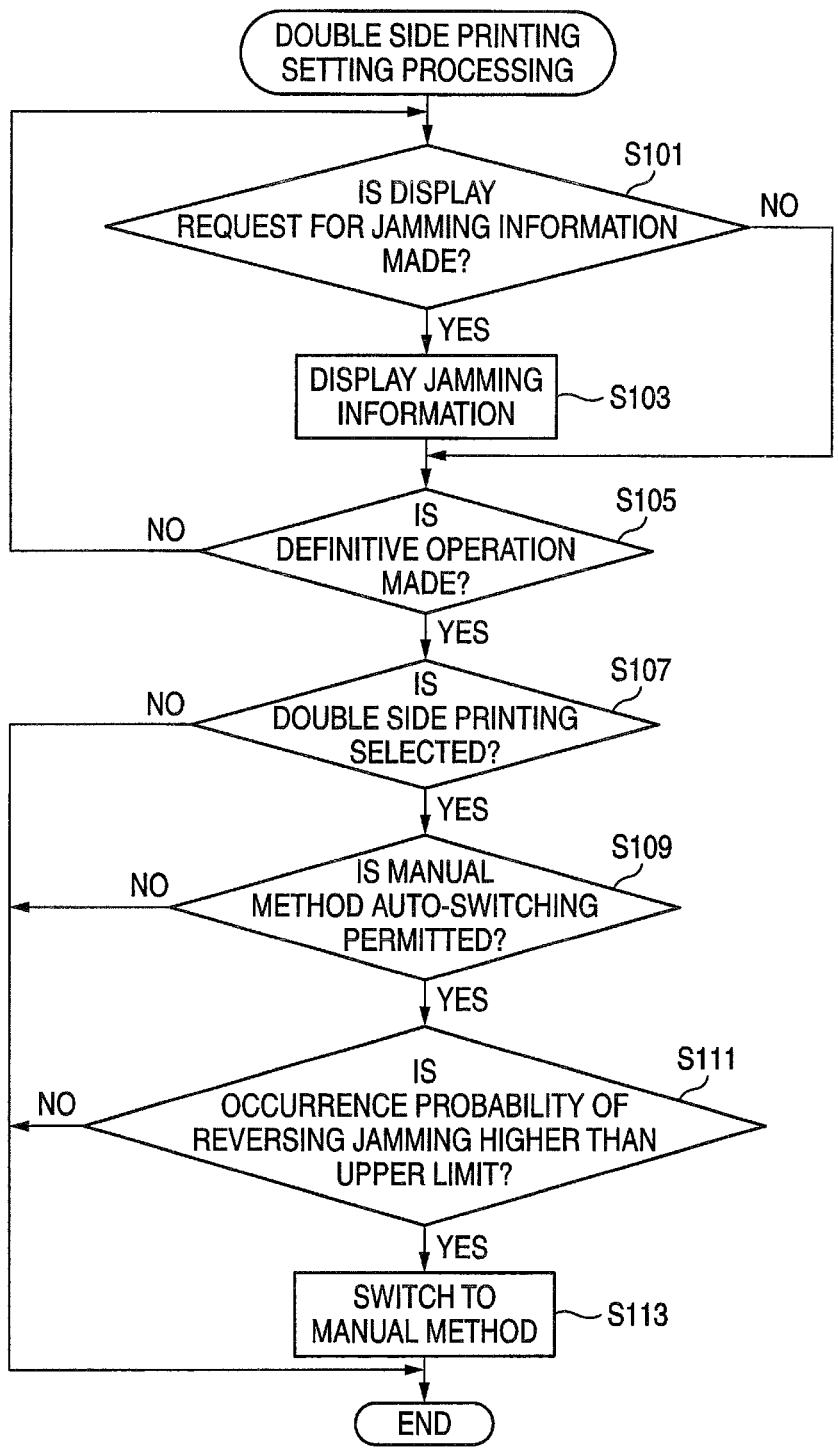
FIG. 8 is a flow chart showing double-side printing setting processing.

FIG. 8 is a flow chart showing the double-side printing setting processing. The CPU 11 performs the double-side printing setting processing, when the double-side printing setting screen is displayed on the display unit 16. At the beginning of the double-side printing setting processing, the jamming information is not displayed on the double-side printing setting screen.

Based on whether the acquisition button is clicked or not, it is determined whether a display request for jamming information is made or not (step S101). When a display request is made (step S101: YES), the latest jamming information is received from the printer 30 and then displayed on the double-side printing setting screen (step S103) (refer to FIG. 6). Accordingly, a user can refer to the displayed jamming information to determine which method to select. At this time, the display unit 16 functions as a first informing unit and a second informing unit.

For example, when the user wants high-speed printing, the user can determine whether to select the 2413 method of which the required time is short and the maximum sheet number is two. When checking the total jamming occurrence probability, the user can determine whether or not to perform the double-side printing of the reversing method. Furthermore, when checking the reversing jamming occurrence probability, the user can determine that it is safe to select the 21 method of which the reversing jamming occurrence probability is low and the maximum sheet number is one. When a display request is not made even though a predetermined time passes (step S101: NO), the operation proceeds to step S105 without displaying the jamming information.

The CPU 11 determines whether or not a definitive operation of the double-side printing setting is made by the user, based on whether or not an OK button or application button is clicked on the double-side printing setting screen (step S105). When a definitive operation is not made (step S105: NO), the operation returns to step S101. When a definitive operation is made (step S105: YES), the selection information of the respective fields on the double-side printing setting screen is temporarily stored in the RAM 13, for example. Next, when it is determined that the user selects the one side printing by referring the above-described selection information (step S107: NO), the double-side printing setting processing is terminated.

When it is determined that the user has selected double-side printing (step S107: YES), it is determined whether the manual method auto-switching is permitted or not, based on the selection information (step S109). When the manual method auto-switching is not permitted (step S109: NO), the double-side printing setting processing is terminated in a state in which the setting contents (the method of the double-side printing processing and the maximum sheet number) selected by the user on the double-side printing setting screen are maintained.

Meanwhile, when the manual method auto-switching is permitted (step S109: YES), it is determined whether or not an occurrence probability of reversing jamming in the method selected by the user on the double-side printing setting screen is higher than an upper limit (for example, 3.0%), based on the jamming information (step S111). When the occurrence probability is equal to or less than the upper limit (step S111: NO), the double-side printing setting processing is terminated without changing the method selected by the user.

On the other hand, when the occurrence probability of reversing jamming is higher than the upper limit (step S111: YES), the method selected by the user is switched into the manual method (step S113), and the double-side printing setting processing is terminated. When the user clicks the OK button or application button of the printing setting screen after the double-side printing setting processing is terminated, the CPU 11 transmits printing data and the variety of printing setting information set on the printing setting screen to the printer 30. The printing data includes image data to be printed, and the printing setting information includes the method of the double-side printing processing and whether or not to permit the manual method auto-switching.

4-2. Processing at Printer

When receiving the printing data and the printing setting information form the terminal device 10, the CPU 31 of the printer 30 controls the printing unit 37 and the conveyance mechanism 38 based on the printing data, and starts the double-side printing processing of the method depending on the printing setting information. At this time, the CPU 31 functions as the control unit. Furthermore, when the double-side printing processing starts, the CPU 31 starts jamming monitoring processing.

Figure 9:
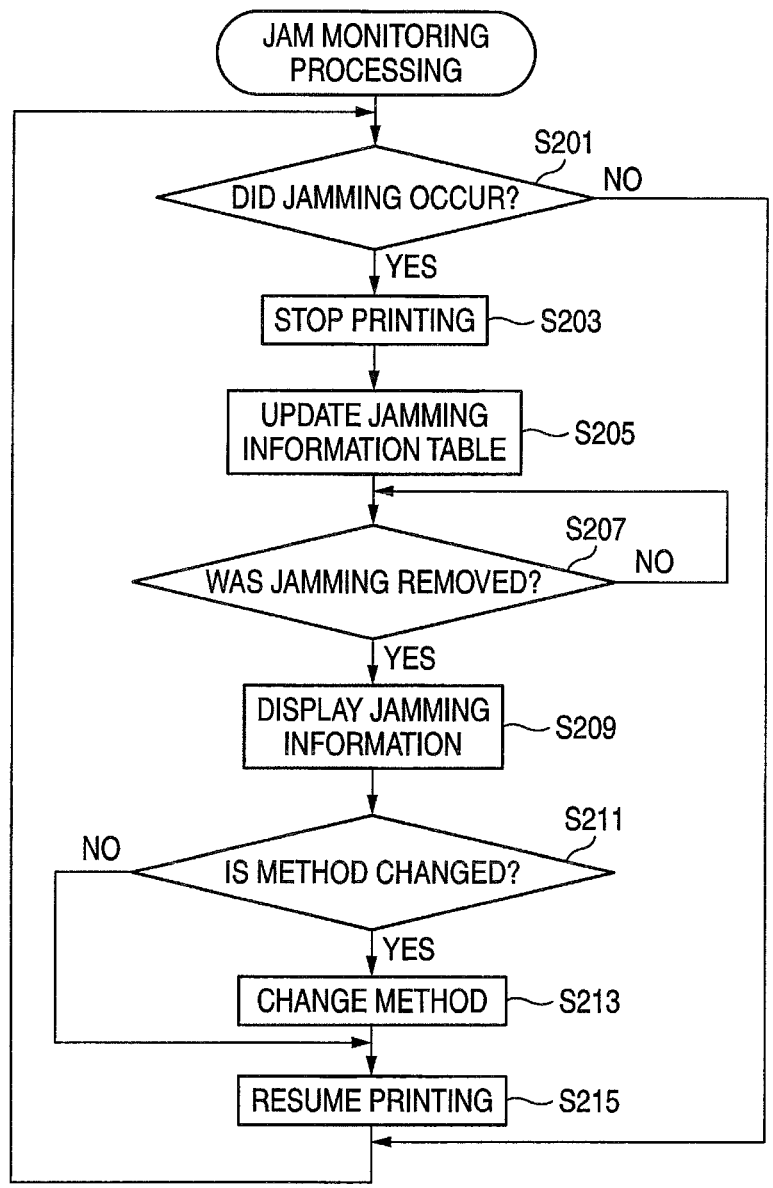
FIG. 9 is a flow chart showing jamming monitoring processing.

FIG. 9 is a flow chart showing jamming monitoring processing. The CPU 31 monitors whether jamming occurred or not, based on detection signals from the respective sensors 40A (step S201). When it is determined that jamming occurred (step S201: YES), the CPU stops the double-side printing processing (step S203), and updates the jamming information table (step S205).

FIG. 10 is a diagram showing an example of the contents of the jamming information table. The jamming information table is original data for generating the jamming information transmitted to the terminal device 10, and is stored in the HDD 34. The jamming information table stores the accumulative number of printed sheets, the total number of jamming, the total jamming occurrence probability (=(the total number of jamming/the accumulative number of printed sheets×100), the number of reversing jamming, and the reversing jamming occurrence probability (=(the number of reversing jamming/the accumulative number of printed sheets×100) for each of the reversing methods. The CPU 31 calculates the total jamming occurrence probability whenever jamming occurs, and updates the jamming information table. At this time, the CPU 31 functions as the calculation unit.

Next, it is determined whether the jamming was removed or not (step S207). For example, when detection signals indicating no sheet exists are received from all of the sensors 40A, it is determined that the jamming was removed. When it is not determined that the jamming was removed (step S207: NO), the CPU 31 waits until the jamming is removed. When it is determined that the jamming was removed (step S207: YES), the jamming information the same as shown in FIG. 6, for example, is displayed on the display unit 36 (step 8209). When checking the displayed contents (the jamming occurrence probability and the required time), the user can determine whether or not to continue the method which is being performed.

The user can change the method of the double-side printing processing through the operation unit 35. When the method is not changed (step S211 NO), the double-side printing processing is resumed as the method before the jamming occurrence (step s215), and the operation returns to step S201. When the method is changed into another method (step S211 YES), the double-side printing processing is resumed as the changed method (step S215), and the operation returns to step S201. At this time, the CPU 31 functions as the changing unit. When the double-side printing processing is terminated, the jamming monitoring processing is also terminated.

5. Effect of the Exemplary Embodiment

According to the exemplary embodiment of the present invention, the intention of a user can be reflected into the method selection for the double-side printing processing. Accordingly, it is possible to improve the convenience of the double side printing.

When jamming occurs in the middle of the double-side printing processing, the method of the double-side printing processing can be changed by the jamming management processing depending on the intention of a user.

<Other Embodiments>

The present invention is not limited to the exemplary embodiment explained with reference to the above descriptions and the drawings, but the following various embodiments are also included in the technical scope of the present invention. In particular, components other than those of the most significant invention among the components of the respective embodiments are additional components, and thus may be properly omitted.

(1) In the above-described embodiment, the 21 method, the 2413 method, and so on have been described as methods of the double-side printing processing, but the present invention is not limited thereto. For example, a 24163857 method of which the maximum sheet number is three may be adopted. That is, while one surface of a sheet is printed and the other surface thereof is then printed, one surfaces of N other sheets (equal to or more than zero) may be printed. In the respective methods, the number of N sheets is not necessarily constant (refer to the 2413 method), but the number of sheets W which exist in the conveyance mechanism 38 when the number of N sheets is the highest may be set to the maximum sheet number.

(2) In the above-described embodiment, it has been described that the double-side printing setting processing is performed at the terminal device 10, but the present invention is not limited thereto. For example, the CPU 31 of the printer 30 may perform the double-side printing setting processing using the operation unit 35 and the display unit 36. In this case, the CPU 31 functions as the acquisition unit, the operation unit 35 is an example of the selection unit, and the display unit 36 is an example of the first and second informing units.

(3) In the above-described embodiment, it has been described that the tray T is provided in the bottom portion of the printer 30, but the present invention is not limited thereto. For example, a manual feed tray (not shown) for guiding sheets to the registration rollers 49 from an insertion port (not shown) opened in the front surface of the printer 30 may be provided. Furthermore, in the manual method, the manual feed tray may be used.

(4) In the above-described embodiment, it has been described that the jamming occurrence probability is taken as an example of the occurrence information of sheet jamming, but the present invention is not limited thereto. For example, the occurrence information of sheet jamming may be a mark depending on the level evaluation of the occurrence probability, and only the occurrence number of jamming may be simply displayed. Furthermore, the occurrence information is not necessarily informed for the overall methods, but may be informed for a method of which the occurrence probability is high or low. Furthermore, a method of informing a user through a sound and a method of informing a user through a lighting pattern or a lighting color of a display lamp may be used as the informing method.

(5) In the above-described embodiment, the level of the jamming occurrence probability is determined in the respective methods, based on the detection signals from the respective sensors 40A, but the present invention is not limited thereto. For example, the respective methods (the maximum sheet numbers) and the jamming occurrence probabilities may be experimentally obtained, and the correspondence relation table thereof may be stored in the HDD 14. Then, the CPU 11 may determine the level of the jamming occurrence probability by referring to the correspondence table. Furthermore, at least any one of temperature, humidity, color, the color number (color or monochrome), a material of the sheets W (thick paper, regular paper, or OHP paper), the type of the tray T, the accumulative number of printed sheets, the number of roller rotations and so on and the jamming occurrence probability may be experimentally obtained, and the correspondence relation table thereof may be stored in the HDD 14. Then, the CPU 11 may determine the level of the jamming occurrence probability by referring to the correspondence relation table.

(6) In the above-described embodiment, when the occurrence probability of reversing jamming is higher than the upper limit in the double-side printing setting processing, the method is switched into the manual method (refer to steps S111 and S113 of FIG. 8), but the present invention is not limited thereto. For example, when there is a reversing method of which the occurrence probability of reversing jamming is lower than the method selected by a user, the CPU 31 may automatically switch the method into the reversing method.

(7) In the above-described embodiment, the method of the double-side printing processing is changed by the intention of a user, after the jamming is removed in the jamming monitoring processing, but the present invention is not limited thereto. For example, the CPU 31 may refer to the jamming information after the jamming occurrence, and automatically change the method into another method of which the jamming occurrence probability is low, under a condition in which it is determined that the jamming occurrence probability of the currently-selected method is higher than a predetermined upper limit.

(8) In the above-described embodiment, when jamming occurs in the jamming monitoring processing, the display of the jamming information and the operation of the method switching are performed at the printer 30, but the present invention is not limited thereto. For example, the jamming information may be displayed on the display unit 16 at the terminal device 10, and the method changing may be performed by the operation unit 15.

What is claimed is:

1. A printing system comprising:
a printing unit configured to perform printing on a sheet;
a conveyance mechanism that includes a printing path for guiding the sheet to a printing position of the printing unit and a reverse path for reversing the sheet which passes through the printing path and guiding the reversed sheet to the printing position once again; and
a controller configured to perform:
a double-side printing process using one of a plurality of conveyance methods using one of the printing path and the reversing path, at least two of the conveyance methods having maximum numbers of sheets existing in the conveyance mechanism at the same time different from each other;
selecting any one of the plurality of conveyance methods according to instruction from a user; and
displaying, before selecting any one of the plurality of conveyance methods, jamming information indicative of at least one of occurrence number of reversing jamming which is a number of times in which sheet jamming occurs at the reversing path during the double-side printing process for each conveyance method, and an occurrence probability of the sheet jamming which is calculated by dividing the occurrence number of the reversing jamming by the accumulative number of printed sheets for each conveyance method,
wherein the double-side printing process is performed in accordance with the selected conveyance method.

2. The printing system according to claim 1, wherein
the double-side printing process is performed using a non-reversing method in which the reverse path is not used, and
the displaying is performed based on occurrence information of sheet jamming in the reverse path.

3. The printing system according to claim 1, wherein the displaying is performed depending on a time required for printing a reference number of sheets for at least one of the plurality of conveyance methods.

4. The printing system according to claim 1, wherein the controller is further configured to change the conveyance method of the double-side printing process in the middle of performing the double-side printing process.

5. The printing system according to claim 1 further comprising:
a plurality of trays for accommodating sheets, respectively; and
a memory configured to store correspondence information between the plurality of trays and the plurality of conveyance methods,
wherein a tray is designated according to the instruction from the user such that the conveyance method corresponding to the designated tray is selected.

6. The printing system according to claim 1 wherein the memory is configured to store correspondence information between the plurality of conveyance methods and a plurality of setting patterns including at least one of material of the sheets and a color number of coloring agents used for double side printing,
wherein a setting pattern is designated according to the instruction from the user such that the conveyance method corresponding to the designated setting pattern is selected.

7. A printing apparatus comprising:
a printing unit configured to perform printing on a sheet;
a reversing mechanism configured to reverse the sheet passing through a printing position of the printing unit and guides the sheet to the printing position once again; and
a controller configured to:
control the printing unit and the reversing mechanism to perform a double-side printing process based on any one of a plurality of conveyance methods, at least two of the conveyance methods having maximum numbers of sheets existing in the reversing mechanism at the same time different from each other;
acquire, from a user selection, information regarding which of the plurality of conveyance methods is selected; and
display, before the user selects any one of the plurality of conveyance methods, jamming information indicative of at least one of occurrence number of reversing jamming which is a number of times in which sheet jamming occurs at the reversing path during the double-side printing process for each conveyance method, and an occurrence probability of the sheet jamming which is calculated by dividing the occurrence number of the reversing jamming by the accumulative number of printed sheets for each conveyance method,
wherein the double-side printing process is performed in accordance with the acquired information.

8. A non-transitory computer readable storage medium storing a printer driver for a printing apparatus including a conveyance mechanism and configured to perform a double-side printing process based on a plurality of conveyance methods, at least two of the conveyance methods having maximum numbers of sheets existing in the conveyance mechanism at the same time are different from each other, the printer driver causing an information processing device which is connected to communicate with the printing apparatus to perform the steps of:

- selecting one of the plurality of conveyance methods according to instruction from a user;
- displaying, before the selecting one of the plurality of conveyance methods, jamming information indicative of at least one of occurrence number of reversing jamming which is a number of times in which sheet jamming occurs at the reversing path during the double-side printing process for each conveyance method, and an occurrence probability of the sheet jamming which is calculated by dividing the occurrence number of the reversing jamming by the accumulative number of printed sheets for each conveyance method,; and
- instructing the printing apparatus to perform the double-side printing process in accordance with the selected method.

* * * * *